United States Patent
Kelly et al.

(10) Patent No.: US 7,832,003 B2
(45) Date of Patent: Nov. 9, 2010

(54) WALLED GARDENS

(75) Inventors: Sean U. Kelly, New York, NY (US); Lili Cheng, Bellevue, WA (US); Ryszard K. Kott, Redmond, WA (US); Richard L. Hughes, Monroe, WA (US); William L. Portnoy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1181 days.

(21) Appl. No.: 11/116,925

(22) Filed: Apr. 28, 2005

(65) Prior Publication Data
US 2006/0248584 A1    Nov. 2, 2006

(51) Int. Cl.
G06F 7/04      (2006.01)
G06F 12/00     (2006.01)
G06F 12/14     (2006.01)
G06F 13/00     (2006.01)
G06F 17/30     (2006.01)
G11C 7/00      (2006.01)

(52) U.S. Cl. .................................. 726/18; 380/250
(58) Field of Classification Search ............ 707/710, 707/3; 726/18, 5, 1, 8; 380/277, 250; 705/55; 709/201
See application file for complete search history.

(56) References Cited

U.S. PATENT DOCUMENTS

| 6,343,280 | B2 * | 1/2002 | Clark ............................ 705/55 |
| 6,542,635 | B1   | 4/2003 | Hu et al. |
| 6,629,100 | B2 * | 9/2003 | Morris et al. .................. 707/10 |
| 6,678,415 | B1   | 1/2004 | Popat et al. |
| 6,922,784 | B2 * | 7/2005 | Phillips et al. ................. 726/18 |
| 7,017,050 | B2 * | 3/2006 | Dalton et al. ................... 726/5 |
| 7,103,912 | B2 * | 9/2006 | Xia et al. ........................ 726/8 |
| 7,136,489 | B1 * | 11/2006 | Madhusudhana et al. ... 380/277 |

(Continued)

FOREIGN PATENT DOCUMENTS

RU    2283508(C2)    9/2006

(Continued)

OTHER PUBLICATIONS

L. Sweeney; k-Anonymity: A Model for Protecting Privacy; May 2002; Carnegie Mellon University, Pittsburgh, Pennsylvania, USA; pp. 1-14.*

(Continued)

*Primary Examiner*—Kambiz Zand
*Assistant Examiner*—Monjour Rahim
(74) *Attorney, Agent, or Firm*—Lee & Hayes, PLLC

(57) ABSTRACT

The subject invention provides a unique system and method that facilitates a controlled communication environment which allows a user to participate in a plurality of privacy contexts with other people in a simultaneous manner in an online community. A user can assign or define varying levels of privacy to his/her information or content to control the visibility of such information by others. In particular, a first user can maintain one or more "gardens" or stores of content which may be accessible to at least a subset of the online community. Access to the contents of any one garden can be based on the privacy level of the garden and the privacy level (e.g., access parameters) granted to the person. The privacy levels and arrangement of content can be hierarchal and/or non-overlapping. Thus, a user can seamlessly communicate with multiple users at the same time regardless of their context or privacy level while maintaining the privacy boundaries of each garden.

19 Claims, 12 Drawing Sheets

U.S. PATENT DOCUMENTS

| | | |
|---|---|---|
| 2003/0182435 A1 | 9/2003 | Redlich et al. |
| 2004/0044655 A1* | 3/2004 | Cotner et al. ............... 707/3 |
| 2004/0111408 A1* | 6/2004 | Caudill et al. ............... 707/3 |
| 2004/0167778 A1 | 8/2004 | Valsan et al. |
| 2005/0111737 A1 | 5/2005 | Das et al. |
| 2005/0138110 A1* | 6/2005 | Redlich et al. ............ 709/201 |
| 2006/0150238 A1* | 7/2006 | D'Agostino ............... 726/1 |

OTHER PUBLICATIONS

International Search Report dated Apr. 28, 2007 and mailed Jul. 23, 2007 for PCT Application PCT/US06/26140, 5 pages.

* cited by examiner

EXEMPLARY PRIVACY GROUP ORGANIZATION

NO OVERLAP BETWEEN PRIVACY LEVELS$_{1-K}$

WALLED GARDENS

TECHNICAL FIELD

The subject invention relates generally to information networks and in particular to systems and methods that provide users with a controlled communication environment including various levels of privacy and/or security that allows a user to communicate with others at such various levels of privacy or security at the same time.

BACKGROUND OF THE INVENTION

One of the most effective channels of disseminating and obtaining information is through direct, personal relationships referred to as a social network. A social network consists of individuals and their personal relationships to other individuals through which information and opportunities are exchanged. The direct, personal relationship implies that two people "know" each other and typically have a certain amount of trust for each other. One person may have more than one or several different social networks which is similar to a person having different groups of friends (e.g., family friends, work friends, school friends, party friends, etc.).

The value of a social network can be demonstrated for example by the "six degrees of separation" phenomenon, which means that the distance between any two individuals in terms of direct personal relationships is relatively small (e.g., 6 degrees or less). Social networks are frequently employed by individuals often without conscious thought. For example, a person may be searching for a job and contact his or her friends to determine if they are aware of available positions. These friends are able to provide reliable information about positions that they directly know about. These friends can also recommend their job-seeking friend for available positions. Furthermore, these direct personal relationships can be employed to obtain social information and/or opportunities such as, for example, information about possible romantic partners, good movies, restaurants, and/or buying, selling, or trading of items and services.

Direct personal relationships are particularly useful in obtaining information and opportunities because of the associated reliability of information and individuals involved. For example, an individual typically is more often willing to swap a vacation home (house-swap) with a friend of a friend, even though the individual may not personally know the friend of a friend, than to house-swap with a stranger. A basis for such trust is that the individual can trust that their immediate friend would not be associated with the person offering to house-swap (e.g., friend of the friend) if the friend of a friend was not reliable or trustworthy. More generally, the immediate friend can be trusted to offer an honest assessment of the trustworthiness of the third party. Social networks are often relied upon for opinion-based information such as for example, movies, restaurants, travel locations, and the like. Such information shared among a large number of the general populous is typically more relied upon than reviews from professional critics.

In the context of an online social network, there continues to be a problem of maintenance, control, and user regulation related to limited system resources and user behavior.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate a controlled communication environment which allows a user to interact with other users of an online community at different privacy levels in a simultaneous manner. The system and method allow a user to assign or define varying levels of privacy to his/her information or content to control the visibility and access of such information by others. In particular, a first user can maintain one or more "gardens" or stores of content which may be accessible or viewable to at least a subset of the community. Access to the contents of any one garden can be based on the privacy level of the garden and the privacy level (e.g., access parameters) granted to another who may be logged into the community. The privacy levels can range from public (e.g., not private) to completely private (e.g., no access by other users permitted) with degrees of privacy dispersed in between. Essentially, a user can seamlessly communicate with multiple users at the same time regardless of their privacy context or level while maintaining control over the privacy boundaries of each garden.

Conventional communication systems that allow some type of exchange of information between users typically require the user (e.g., content owner) to move between a public or private context (e.g., similar to switching modes) based on the context of the other user (e.g., person seeking access to content). This can often cause user confusion as well as many other communication and security problems. Other conventional communication systems only offer an all-public environment or an all-secure environment where, in either case, users are given access to all the information on the system in either an unrestricted or secure manner, respectively. Unlike these conventional systems, the subject invention facilitates simultaneous communication in both public and private contexts that is effectively transparent to the communicating parties.

For example, a first user can post a group of photos, designating some public and some private. A second user with only public access rights can view the public photos and communicate with the first user about the public photos but does not see or know about the private photos. At the same time, a third user with private access rights can view the private photos and converse with the first user about such private photos.

Different approaches can be employed for this to occur. In one approach, this can be accomplished in part by initially determining the access rights, if any, of the second and third persons. When the access rights are acknowledged, the second and third users can be presented with the respective content available to them. When no access rights are found, only public access or only public content can be made available to the person. Alternatively, no access can be afforded when access rights are not found. In another approach, the system can automatically place the second and third users "in" their respective gardens by identifying their access rights according to their login information. In this approach, access to the community can automatically grant the second or third user with access to at least the public content and therefore place the appropriate user in the appropriate garden upon login.

Access to any particular garden or store can also provide a user with the ability to blog or post messages, pictures, and/or other content within that garden. In addition, the user can view other users' content posted in that garden and/or add comments and annotations to content posted or published by other users within that garden.

According to one aspect of the invention, the gardens or stores can be accessible from a public network such as the World Wide Web or from a private network to a more discrete set of users. Hence, the community of users can be the public-at-large or a more specific group of users such as a social group of people, employees of a company, or students of a university.

According to another aspect of the invention, the gardens or stores of content can be organized in a hierarchal manner as well as in a non-overlapping manner. Hence, access rights can overlap with or mutually exclude access to other gardens with lower levels of privacy. In addition, a user may be "located" in several different gardens and communicating therefrom at the same time. Thus, the presentation of the content of each garden to the user may depend on which garden is taken into account at the moment. That is, the content presented to the user can depend on several different gardens.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
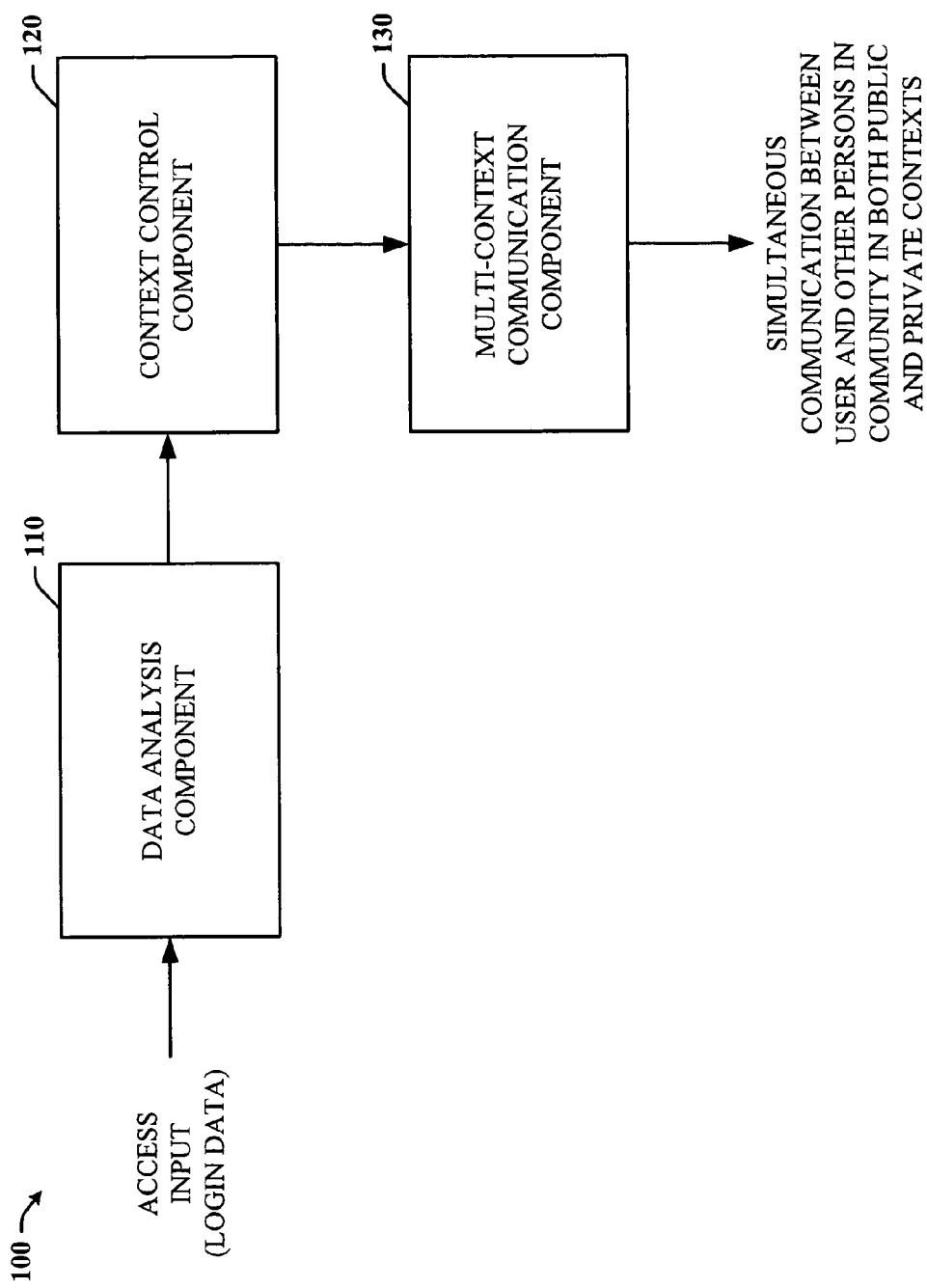
FIG. 1 is a high-level block diagram of a controlled communication system that facilitates simultaneous communication in both private and public contexts in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with automatically granting or providing additional access rights to a user's protected content which can be based at least in part on the user's actions or communications with another person (to which the access rights would be granted). In addition, such inference schemes can be employed in part to determine which content to display to a person communicating with the content owner (user)—especially in cases where the person has access rights to multiple groups of content but not all the groups can be accessed by the person at once. Other scenarios though not discussed here can also make use of one or more inference schemes to carry out the subject invention, and such are contemplated to fall within the scope of the invention.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Throughout the description of the subject invention, the terms "user" and "person" are employed to distinguish between the parties involved. In particular, the term "user" generally refers to an owner or co-owner of content or group of content which is potentially accessible by others via an online community (e.g., World Wide Web, company network, school network, etc.). Each group of content can also be referred to as a "garden".

The term "person" generally refers to any other user that has access to the online community and who can potentially interact with any owner or co-owner of a garden as well as the garden itself depending on the access rights or privacy level granted thereto. Each garden or cluster of gardens can also be assigned a privacy level. When the privacy level of a garden is "satisfied" by or corresponds to a person's privacy level, then that person can be given access to that particular garden. In general, access can be minimal such as passive viewing of a garden's content or at least a portion thereof. Access to or the ability to view any particular garden or piece of content can be subject to one or more presentation rules as determined by the user for the particular garden or piece of content.

Referring now to FIG. 1, there is a general block diagram of a controlled communication system 100 that provides for a communication environment in which information included therein can be both public and private depending on user preferences. The system 100 includes a data analysis component 110 that receives and examines access input such as a person's login data (e.g., username, password, etc.) as well as any information derived therefrom. The data analysis component 110 can determine the identity of the person as well as recognize the access capabilities granted to the person while "in" the communication environment.

The information determined by the data analysis component 110 can be communicated to a context control component 120. The context control component 120 can regulate the interaction between garden owners/co-owners (users) and at least one person currently "in" the communication environment. For example, imagine that a user has both public (e.g., not private) and private content that are maintained in at least two respective groups: a public group and a private group. Person A is given the minimum access rights and thus can only access the public group while Person B is given a higher degree of access rights and thus can access the private group. To maintain these boundaries between the groups of content, similar boundaries can be employed when communicating about such content with the content owner. Thus, the communication can be in a public context when dealing with the public group and any person associated therewith. Similarly, the content owner and any person associated with the private group can interact in a private context.

The context control component 120 can manage and control the interaction between the user (or the user's content) and the respective persons so that the privacy context (e.g., public context, private context, very private context, etc.) is preserved for each person despite simultaneous interaction in both the public and private contexts. In addition, the operations of the context control component 120 are transparent to the user as well as to the person(s) interacting with the user. Hence, such person may not be aware of any other group of content that he/she does not have access to and the user need not worry about being confused as to which person can see what content.

Furthermore, a multi-context communication component 130 facilitates user interaction and/or communication at a plurality of contexts in a simultaneous manner without requiring the user (content owner) to switch between privacy modes for each of the different privacy levels each person may be assigned to. Moreover, the user can freely communicate with a plurality of people at different privacy levels who are privy to different content without concern as to how secure the environment is or needs to be before communication can commence with a particular person.

Figure 2:
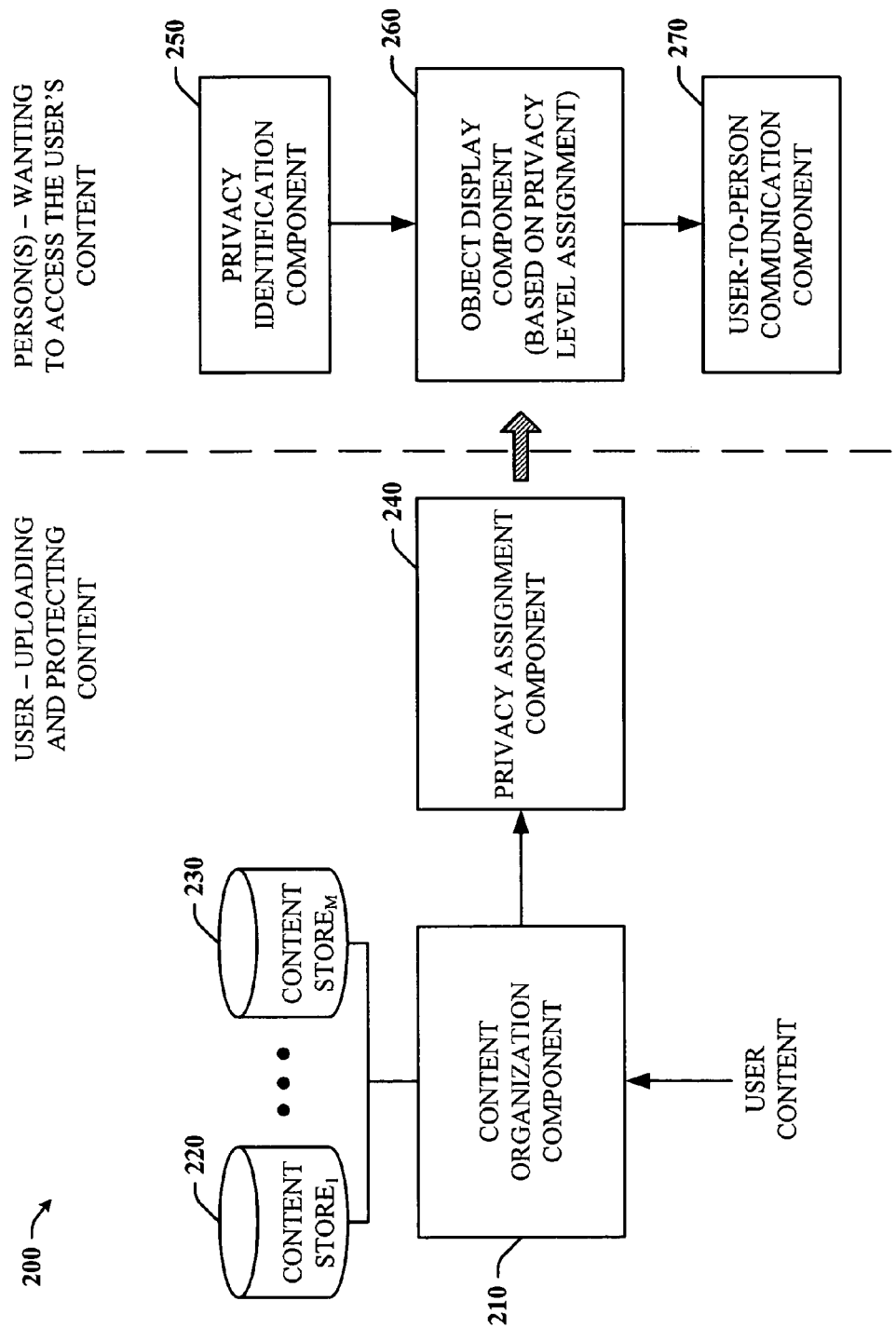
FIG. 2 is a block diagram of a controlled communication system that facilitates simultaneous communication between a user and other persons in both private and public contexts in accordance with an aspect of the subject invention.

Referring now to FIG. 2, there is illustrated a block diagram of a controlled communication system 200 that facilitates establishing gardens or groups of content and controlling access to such content in accordance with an aspect of the subject invention. In order to establish various levels of protection for the user's content, the system 200 includes a content organization component 210 that can organize the user's content into one or more databases (CONTENT STORE$_1$ 220 and/or up to CONTENT STORE$_M$ 230, where M is an integer greater than or equal to one). Each database can be referred to as a garden, whereby each garden can be assigned a privacy level via a privacy assignment component 240. The user's content can be sorted according to the privacy level desired by the user for each piece or type of content. However, it should be appreciated that the user's content need not be organized into physically separate content stores, as the distinction of content groups may be on a logical level. In addition, the content can be assigned to overlapping content stores such as when the privacy groups overlap.

Using a similar delineation of privacy levels, the privacy assignment component 240 can also assign privacy levels to the user's contacts or any person in the user's social network. Since the user may not know or be able to identify every person by name in the online community, any person without an assigned privacy level can be given the minimum privacy level (e.g., public access rights only) by default.

Once the gardens have been established, at least a portion of the content may be available to other persons logged into the online community. However, before any content can be displayed, a privacy identification component 250 can identify the person desiring such access to determine his/her privacy level. After this is determined, a content display component 260 displays the appropriate content or allows the person access to such content. That is, at least one garden is made visible to the person based on the privacy level assigned to the garden and to the person. If no privacy level has been assigned to the person, a garden deemed suitable for public viewing can be displayed. Following, a user-to-person communication component 270 can be employed to facilitate communications between the user and the person that are associated with the particular garden on display. As a result, the user need not guess which content the person is referring to in his/her communications and can readily communicate with more than one person at a time regardless of the privacy level involved. Examples of communications include, but are not limited to, blogging, chatting, instant messaging, emailing, and/or talking.

Figure 3:
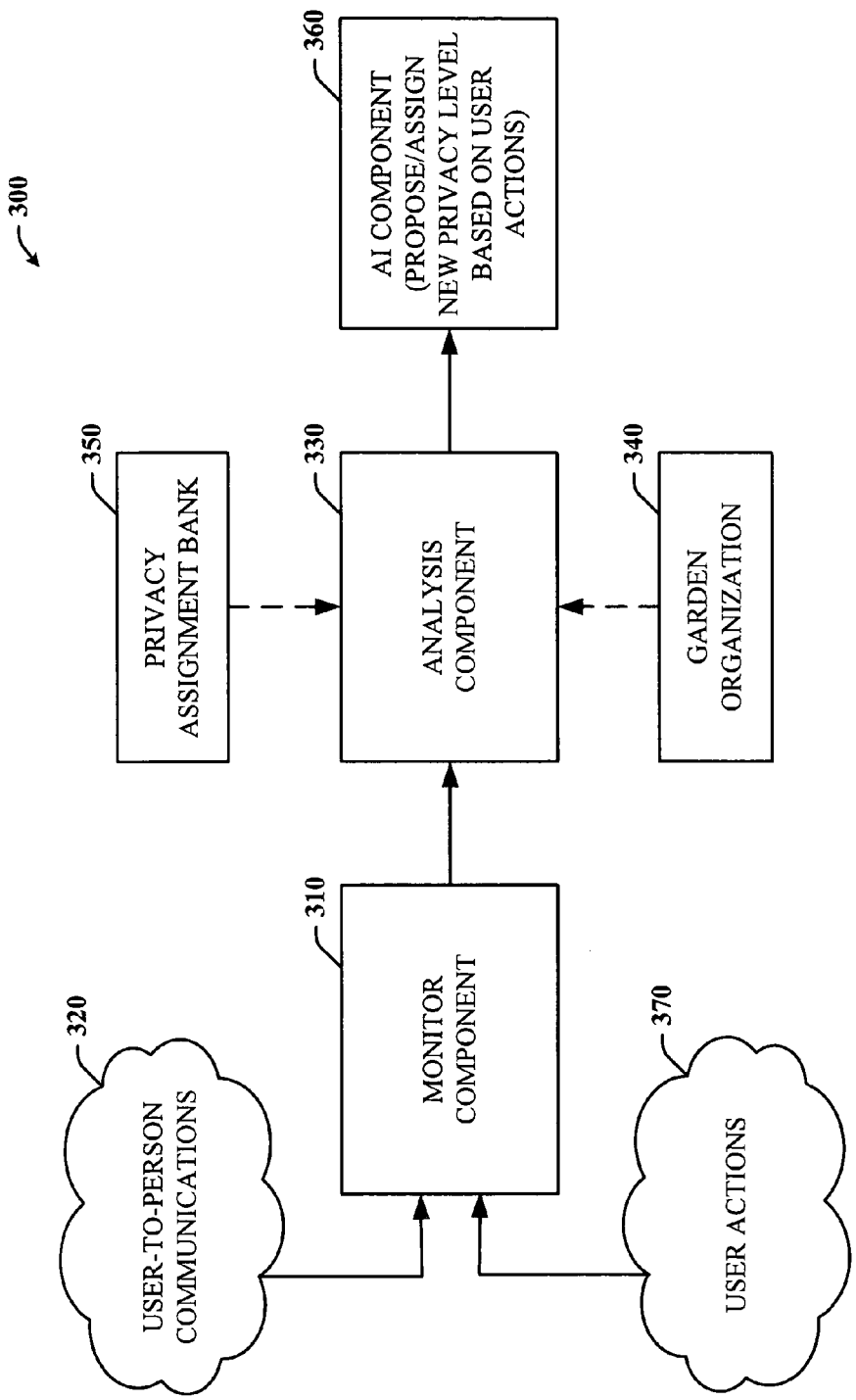
FIG. 3 is a block diagram of an automated controlled communication system that automatically proposes or assigns a new privacy level to a person communicating with a user based on the user's communications and/or actions in accordance with an aspect of the subject invention.

Turning now to FIG. 3, there is a block diagram of an automated controlled communication system 300 in accordance with an aspect of the subject invention. In particular, the system 300 can be employed to automatically determine or adjust the privacy level of a garden or any content, in general, based at least in part upon user actions. Similarly, the system 300 can automatically allow people to access certain garden owned or co-owned by the user based at least in part on user actions involving or communications exchanged with such people.

To accomplish the foregoing, the automated system 300 includes a monitor component 310 that can observe and collect user-to-person communications 320 such as comments or messages exchanged between the user and the subject person (or persons). For example, imagine that the user mentions to George, a friend of a friend and an art collector, that he is also an art collector and recently acquired a few paintings from a local estate sale. The user may go on to mention the artist or painting names in subsequent exchanges with George. The monitor component 310 can communicate such information to an analysis component 330. The analysis component 330 can consume and process this information and recognize that the user has previously established a garden (e.g., paintings garden) including pictures of paintings (based on the garden organization 340) and that George does not currently have access thereto (according to the privacy assignment bank 350). An artificial intelligence (AI) component 360 can be trained to automatically suggest or assign such persons like George with the appropriate access rights to gain access to this particular garden. Alternatively or in addition, the AI component 360 can propose or assign George with the appropriate privacy level which may provide him with access to the appropriate garden as well as to other gardens having a similar privacy level.

Similarly, user actions 370 can also be monitored. Such actions can include privacy assignments previously made for other content (e.g., related content) or for other people who may belong to the same social network, distribution list, or contact list as the subject person. For instance, George may be included in or added to the same distribution list as Paul. The user may have already given Paul a privacy level that allows Paul to access a select group of gardens. Thus, the AI component 360 can learn to also assign George or any other person added to the distribution list with a similar (or the same) privacy level. Since some people may be included in more than one distribution list or be assigned various access rights and privacy levels, a distribution or any other list can be assigned with a particular privacy level. Thus, when a new person is added to the list, that person can be assigned the privacy level of the list—rather than the privacy level(s) of the other people on the list. This can important since at least one person on any list may have been assigned additional privacy levels.

The user can train the AI component 360 according to his/her preferences. Other examples of user actions 370 include, but are not limited to, changes to the user's social network with which the gardens are associated and changes to the privacy level restrictions of at least a subset of the gardens.

Figure 4:
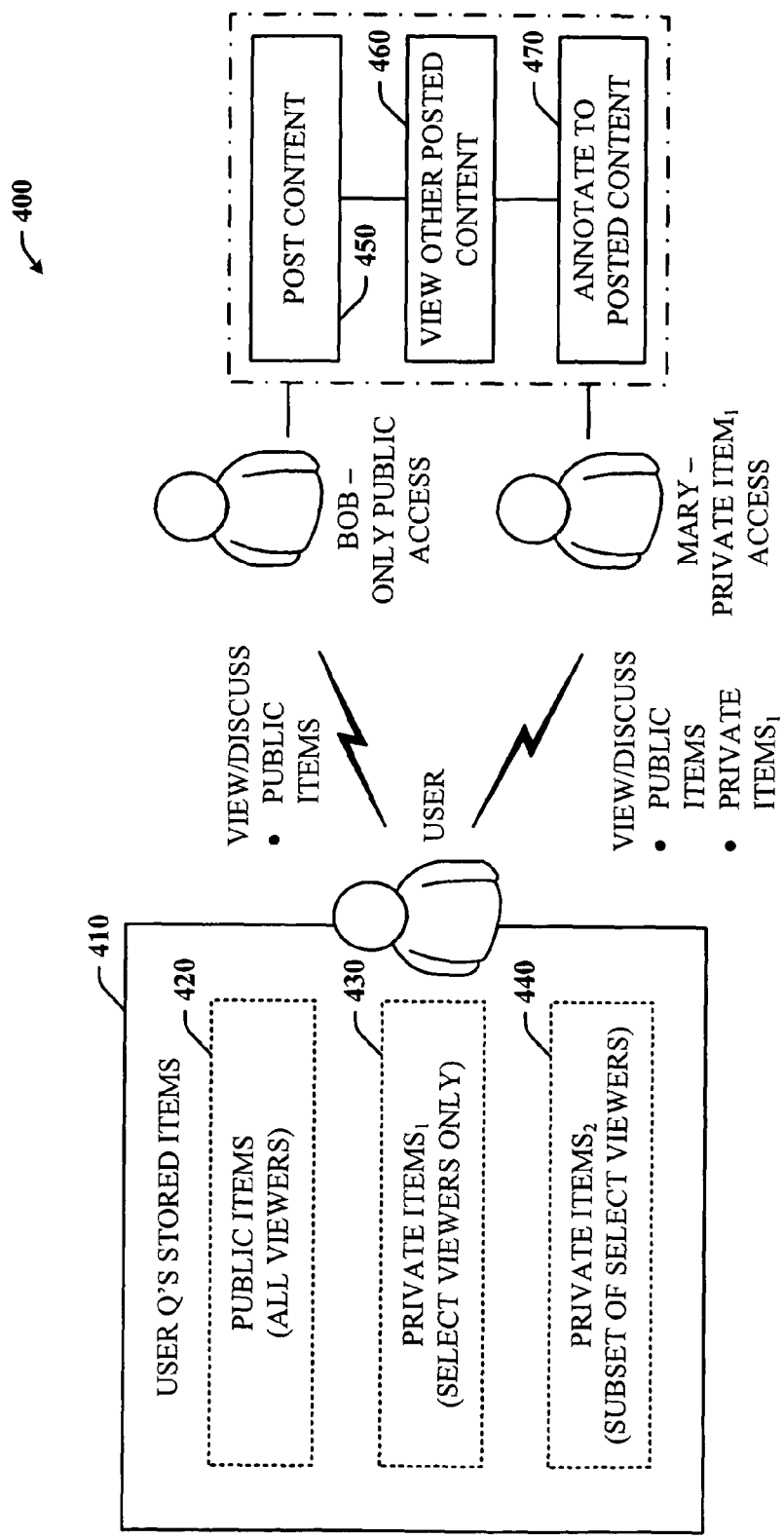
FIG. 4 is a block diagram demonstrating simultaneous interaction in both public and private contexts in accordance with an aspect of the subject invention.

Moving on to FIG. 4, there is illustrated a schematic diagram that demonstrates a controlled communication environment 400 in accordance with an aspect of the subject invention. The environment 400 includes the user's content or stored items 410 which can be further grouped according to content type, subject matter, etc. as desired by the user. Each group can then be assigned a privacy level by the user. For example, one group can be deemed public items 420 which may be accessible by all others in the community. Alternatively, the user can mark a message, conversation, or any other object with a privacy level as each arises (e.g., "on-the-fly"). For instance, the user may be "chatting" with a person and decide at that moment that the conversation is or has become very private and mark it with an appropriate privacy level. Therefore, content can be given a privacy level on a per-item basis or as a group.

In addition, such public items 420 may be viewable (e.g., passive viewing) by others outside of the community as determined by the user. For instance, if the community is defined as a school network comprising of only school students and employees, the public items 420 or a portion thereof may be available for passive viewing by those outside of the school community.

The user's other groups of content can be characterized with varying degrees of privacy, such as PRIVATE ITEMS$_1$ 430, to which selected viewers can access and PRIVATE ITEMS$_2$ 440, to which a subset of the selected viewers or other selected viewers can access. As shown in the figure, Bob has been granted access to the user's public items 420 whereas Mary has been granted access to the user's public items 420 as well as the PRIVATE ITEMS$_1$ 430. When access to any group of content is given, such access can include: allowing the person (e.g., Bob and Mary) to post content 450 to such group or to a particular item in the group, to view other posted content 460 in the group or to annotate to previously posted content 470. At a minimum, access can include passive viewing the content. In some cases, Bob or Mary may be allowed to export at least a portion of the content to which they have access out of the designated group based on the user's preferences.

Moreover, the user can communicate with Bob and Mary simultaneously, and thus, in different privacy contexts, without needing to actively or consciously switch between contexts to do so. Rather, such changes in context can occur transparently to the user as well as to Bob and Mary.

Figure 5:
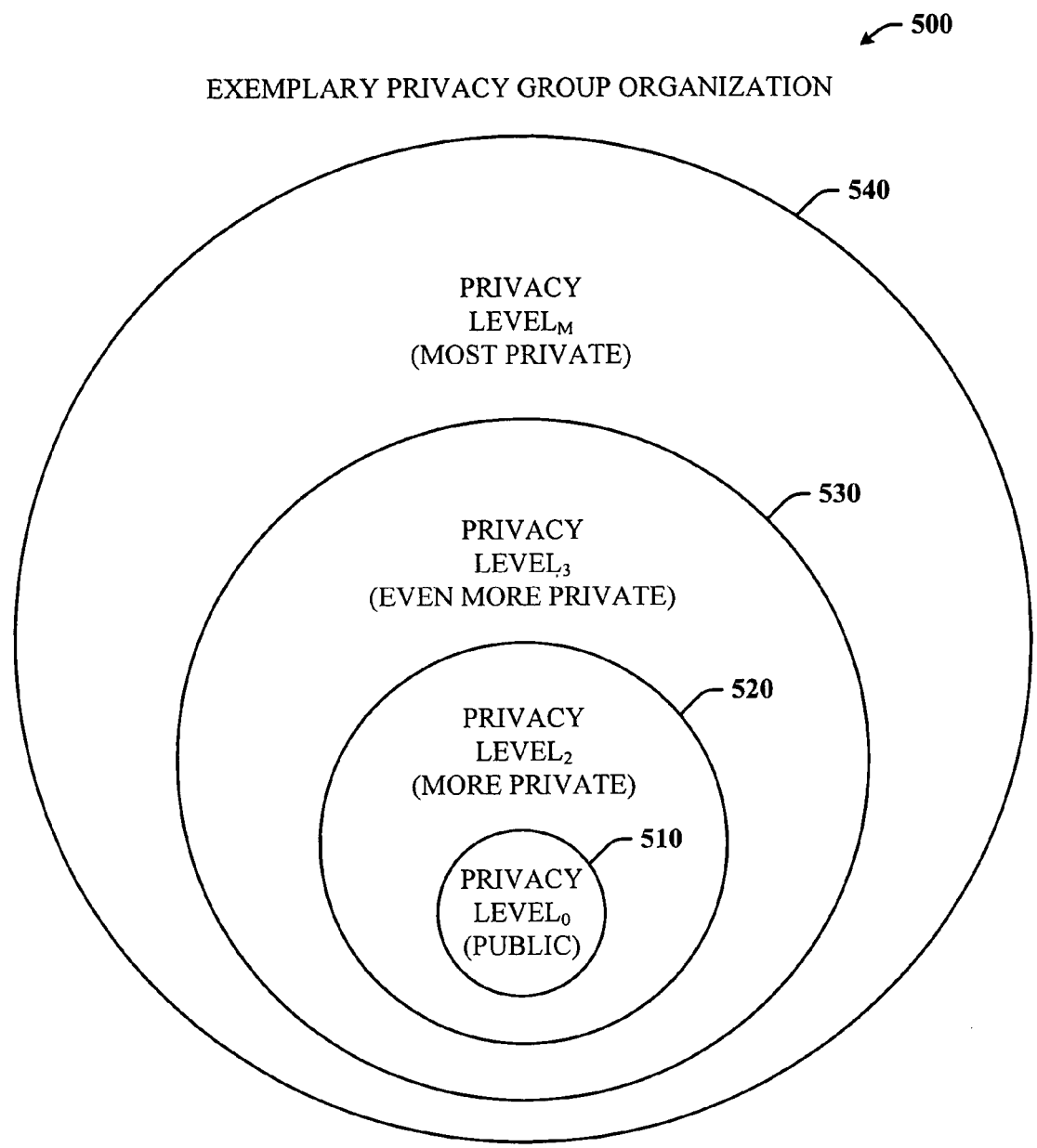
FIG. 5 is a schematic diagram of an exemplary privacy group/level arrangement in accordance with an aspect of the subject invention.
Figure 6:
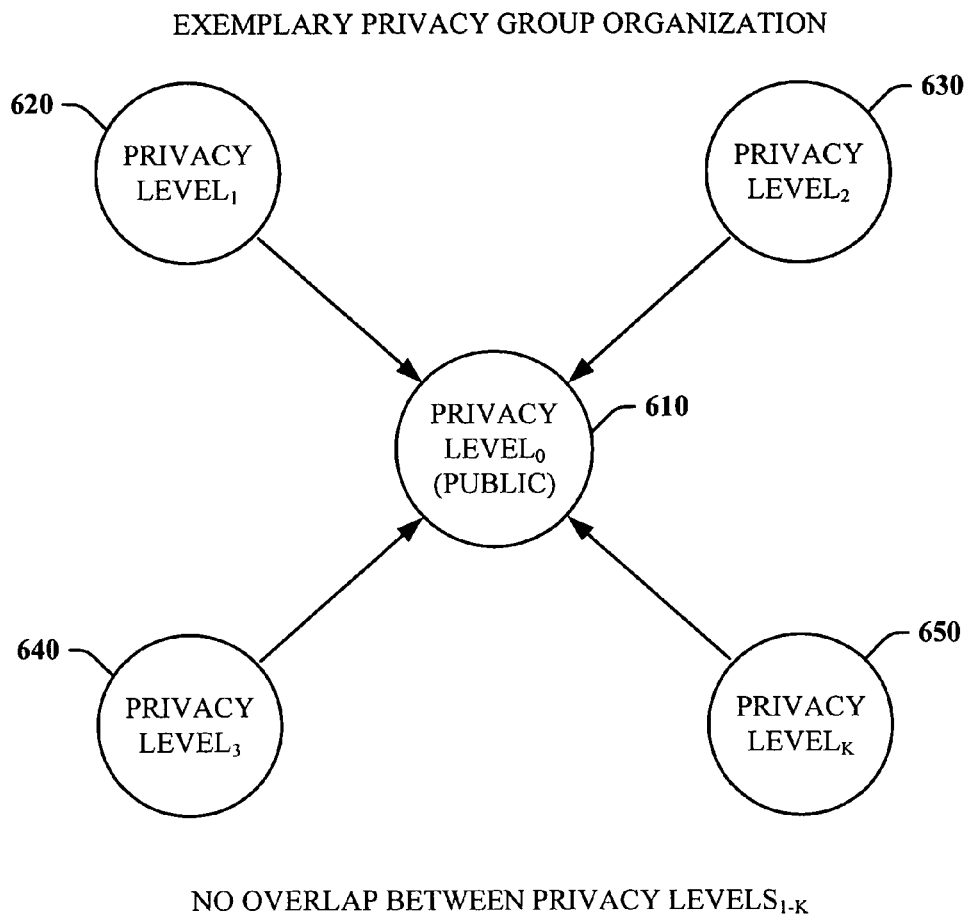
FIG. 6 is a schematic diagram of an exemplary privacy group/level arrangement in accordance with an aspect of the subject invention.

In general, the user's content can be organized in a hierarchal, overlapping manner as demonstrated by an exemplary diagram 500 in FIG. 5 or in a non-overlapping manner as depicted by the diagram 600 in FIG. 6. For example, in FIG. 5, the content is grouped and each group is given a privacy level. Here, PRIVACY LEVEL$_0$ 510 represents content with minimal privacy, or in other words, content which is available to the public. PRIVACY LEVELS$_{(1-M)}$ (520, 530, and 540, respectively, where M is an integer greater than or equal to one) represent content with increasing levels of privacy. Persons with access to the PRIVACY LEVEL$_1$ content 520 also have access to the PRIVACY LEVEL$_0$ 510 content. Put another way, people with access to the PRIVACY LEVEL$_M$ 540 content also have access to the content with lower levels of privacy.

Alternatively, groups of content can be non-overlapping and hence, mutually exclusive of each other as demonstrated in FIG. 6. With the exception of the public content 610, persons with access to content with some level of privacy indicated (e.g., increasing levels of privacy from 1 (620), 2 (630), 3 (640) and/or up to K (650) (where K is an integer greater than or equal to one) do not implicitly have access to other private content regardless of their privacy level. Hence, if a person is given access to PRIVACY LEVEL$_3$ 640 content, then the user also needs to explicitly assign any lower privacy level (e.g., LEVEL$_1$ 620 and/or LEVEL$_2$ 630) in order for the person to have access to that content as well. It should be understood that the content can be organized in other ways such as, for example, a combination of hierarchal and non-overlapping groups.

Figure 7:
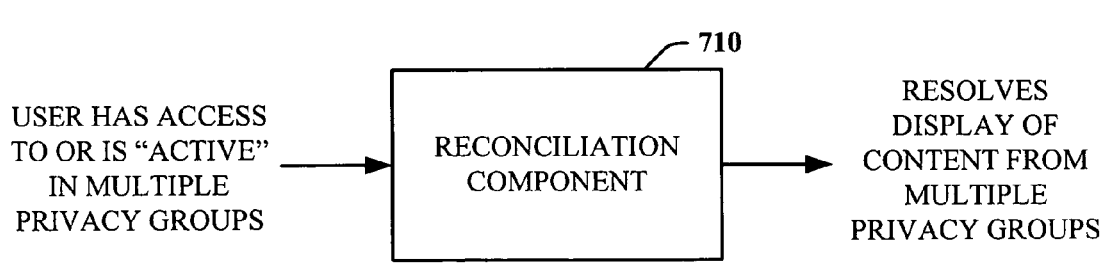
FIG. 7 is a block diagram of a sub-system that operates cooperatively with the systems of FIG. 1 or FIG. 2 that facilitates resolving the display of content to a person with access to multiple privacy groups.

Due to the nature of the subject invention, the user can be active or interacting with multiple people at various contexts of privacy—some public, some somewhat private, or some very private. During such interactions, the user can be presented with the content relevant to the interaction occurring at the moment. The presentation of the relevant content can remind the user of the level of privacy assigned to the content or merely provide the user with a frame of reference for such interaction. Interacting with more than one person in more than one privacy context at the same time can be become relatively chaotic for the user. To maintain a sense of order for the user, a reconciliation component 710 as shown in FIG. 7 can be employed and included in the controlled communication systems 100, 200 of FIGS. 1 and 2, respectively, supra.

The reconciliation component 710 can determine the presentation of content and/or gardens to the user based at least in part upon which gardens are active at the moment. For example, some gardens may be established by the user with presentation rules which dictate how content is displayed to the user as well as to the person communicating with the user about such content. In general, the reconciliation component 710 can resolve issues regarding the display of content as it affects the user as well as the people interacting with the user.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 8:
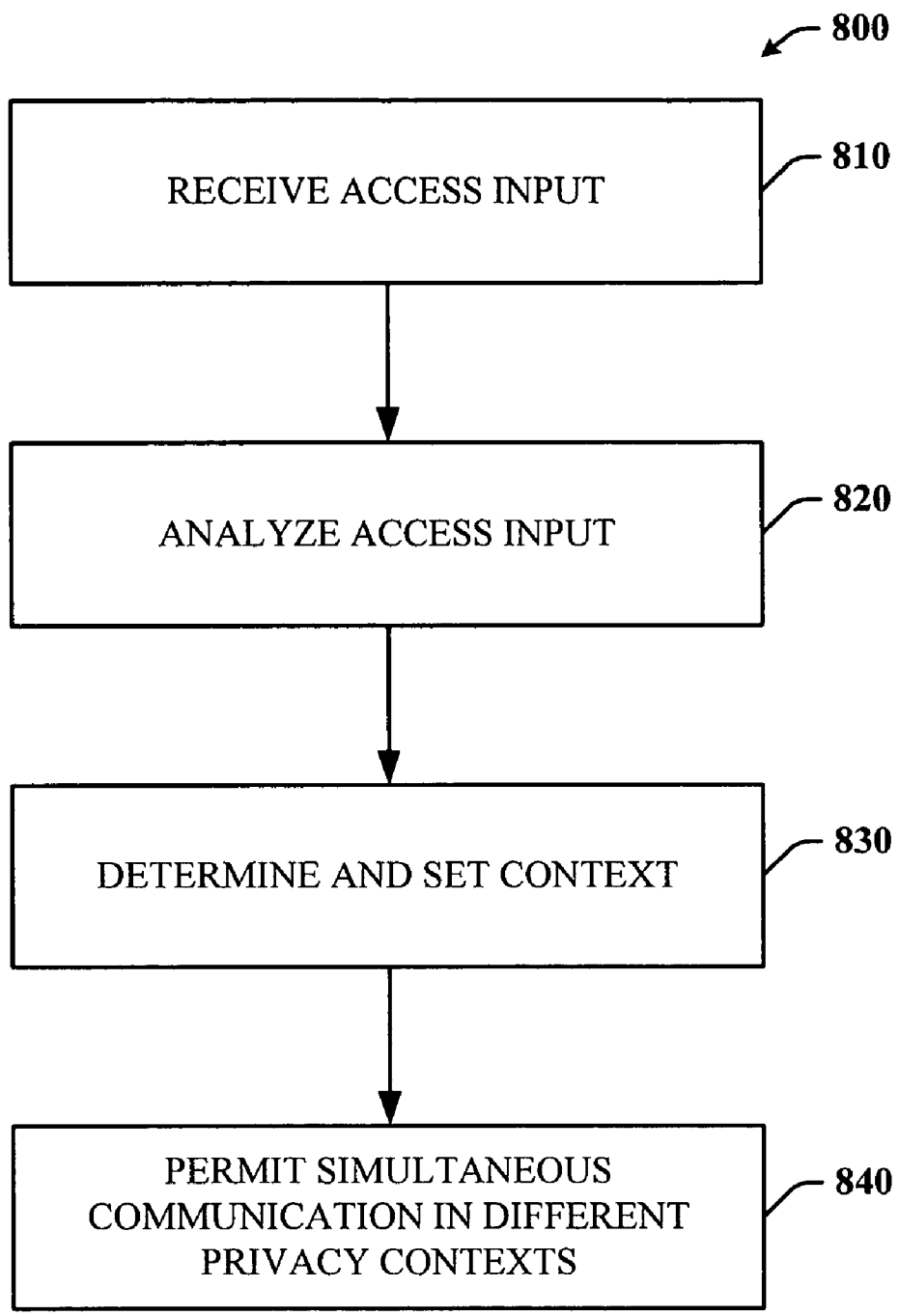
FIG. 8 is a flow chart illustrating an exemplary methodology that facilitates simultaneous communication in multiple privacy contexts in accordance with an aspect of the subject invention.

Referring now to FIG. 8, there is a flow diagram of an exemplary method 800 that facilitates simultaneous communication in multiple privacy contexts in accordance with an aspect of the subject invention. The method 800 involves receiving a person's access input such as the person's login information for gaining access to an online community at 810. The online community can be expansive such as the World Wide Web or more restrictive such as a company, school, or members-only community.

At 820, the access input can be analyzed in order to identify and authenticate the person's identity and access rights to the community in general and/or to specific users' content in the community. At 830, the person's privacy context can be determined with respect to content owned by others in the community and interaction with such content can commence accordingly. It should be appreciated that more than one person can be logged into the community in a similar manner.

At 840, simultaneous communications in different privacy contexts can take place between at least one user and one or more persons interacting with the user's content. That is, the user can effortlessly interact with at least two different people who have different privacy context associated therewith at the same time without being required to consciously switch between privacy contexts or modes. The same holds true when only one person is communicating with the user. This is because it is feasible for one person to be assigned more than one privacy level. Hence, the user can interact with such person at both privacy levels without concern. The method 800 allows the user to ignore the current context (the person's context) by automatically adjusting the user's context as necessary.

Figure 9:
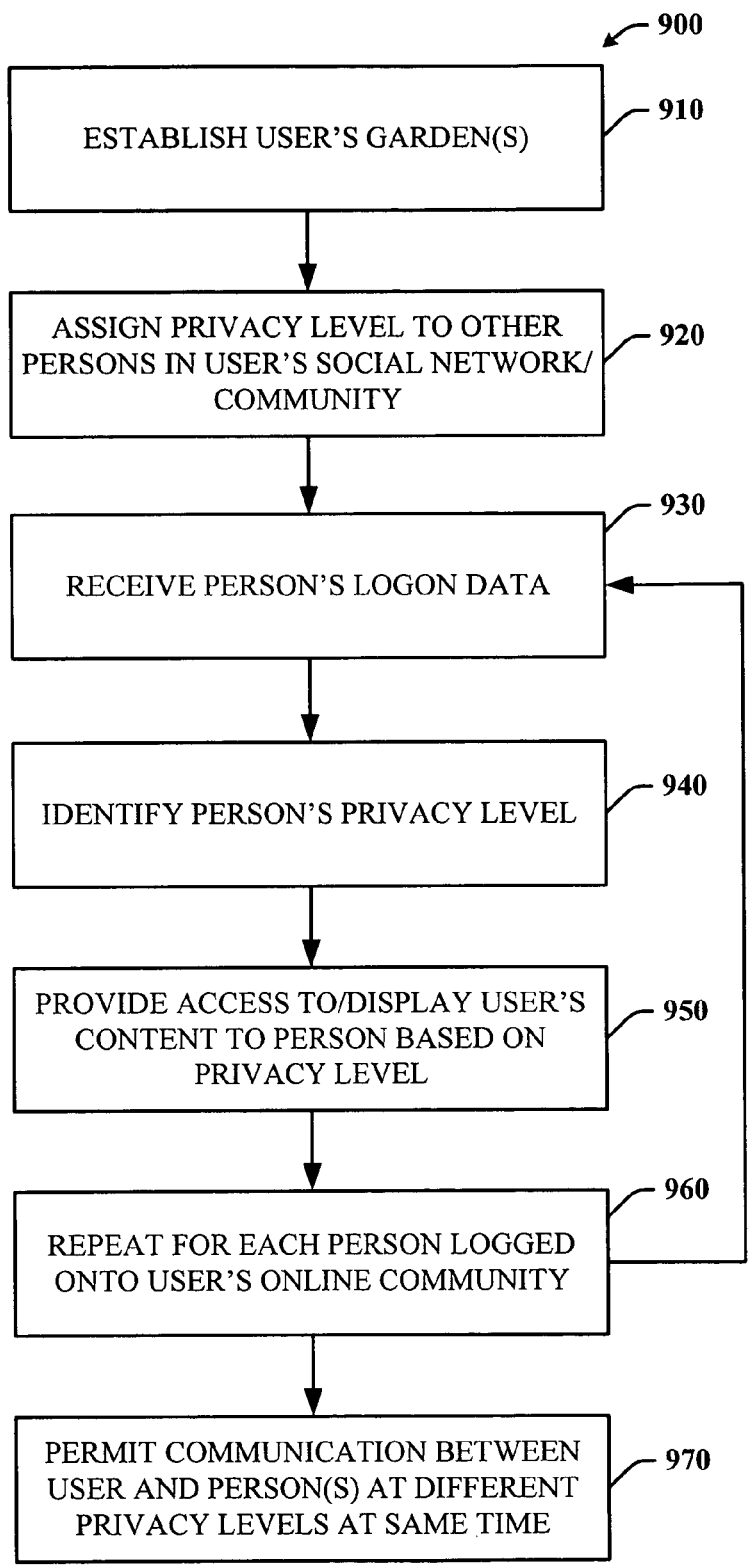
FIG. 9 is a flow chart illustrating an exemplary methodology that facilitates simultaneous communication in both private and public (not private) contexts in accordance with an aspect of the subject invention.

Referring now to FIG. 9, there is a flow diagram of an exemplary method 900 that facilitates simultaneous communication in both private and public (e.g., not private or minimal privacy) contexts in accordance with an aspect of the subject invention. The method 900 involves establishing a user's garden(s) at 910. This can be accomplished in part by uploading the user's content to make it available to an online community subject to various restrictions. For example, one or more privacy levels can be assigned to the content. The privacy levels can include private or public and/or degrees of privacy. The user can assign an appropriate level of privacy to the content, or alternatively, the system or method can recognize the context of the content and automatically assign an appropriate privacy level. In the latter case, certain kinds of content can only be "placed" in gardens with a suitable privacy level. For example, the system or method can be trained to recognize medical or medical-related information and automatically assign the highest privacy level. As a result, this information can be put in the appropriate garden.

At 920, the user can assign privacy levels or grant access rights to those people in the user's social network or online community. For example, everyone in the user's online community can be given access to the user's "public" content. Such public access can be given by default or explicitly by the user. Other people in the community that are known to the user can be assigned one or more privacy levels that correspond to the privacy levels assigned to the user's content.

At 930, a person's login data can be received and that person's privacy level(s) can be identified at 940. At 950, access to the respective user's content can be obtained based on the person's privacy level. The authentication of the person's identity and privacy levels (e.g., 930 through 950) can be repeated for each person logging into the community at 960. At 970, any one user can communicate or otherwise interact with one or more people at different privacy levels at the same time.

Figure 10:
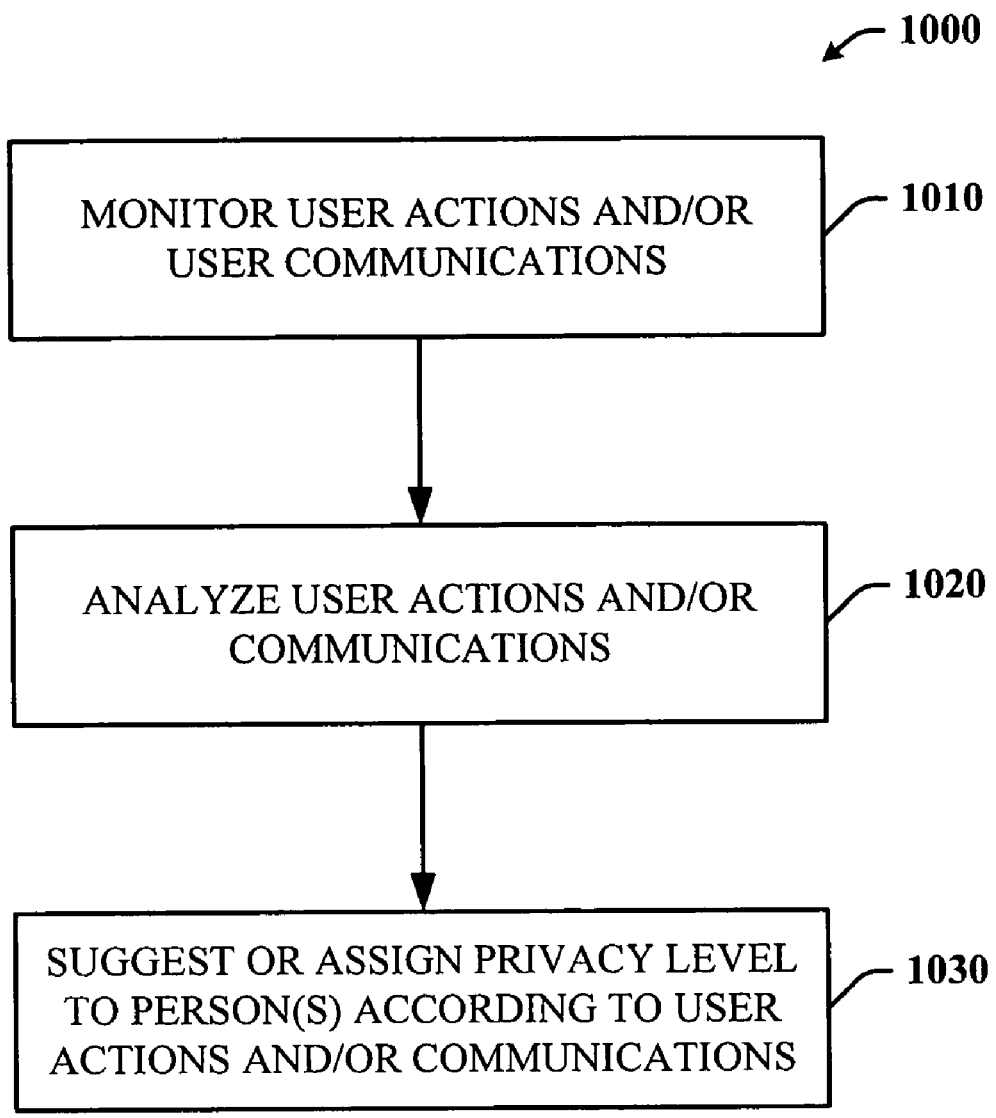
FIG. 10 is a flow chart illustrating an exemplary methodology that facilitates automatically proposes or assigns a new privacy level to a person communicating with a user based on the user's communications and/or actions in accordance with an aspect of the subject invention.

Turning now to FIG. 10, there is a flow diagram of an exemplary method 1000 that facilitates automatically proposing or assigning a privacy level to a person communicating with a user based on the user's communications and/or actions in accordance with an aspect of the subject invention. The method 1000 involves monitoring user actions and/or user communications with respect to any relevant person at 1010. Examples of user actions include privacy level assignments previously made to other people in the same distribution list as the relevant person, the privacy level assignments already made for the relevant person for similar content, reorganization of the user's social network or gardens, and the like. User communications can include interactions between the user and the relevant person such as specific discussions, messages, conversations, and the like.

The information collected while monitoring at 1010 can be analyzed at 1020 to determine whether any changes to the assigned privacy levels should be made and if so, what types of changes should be made or suggested to the user. At 1030, the method can be trained to automatically suggest or assign the most appropriate privacy level for a particular person based at least in part on the user's actions and/or communications the user has had with the person. As a result, the user can be more confident that the privacy levels assigned to others have been assigned in a consistent manner.

Figure 11:
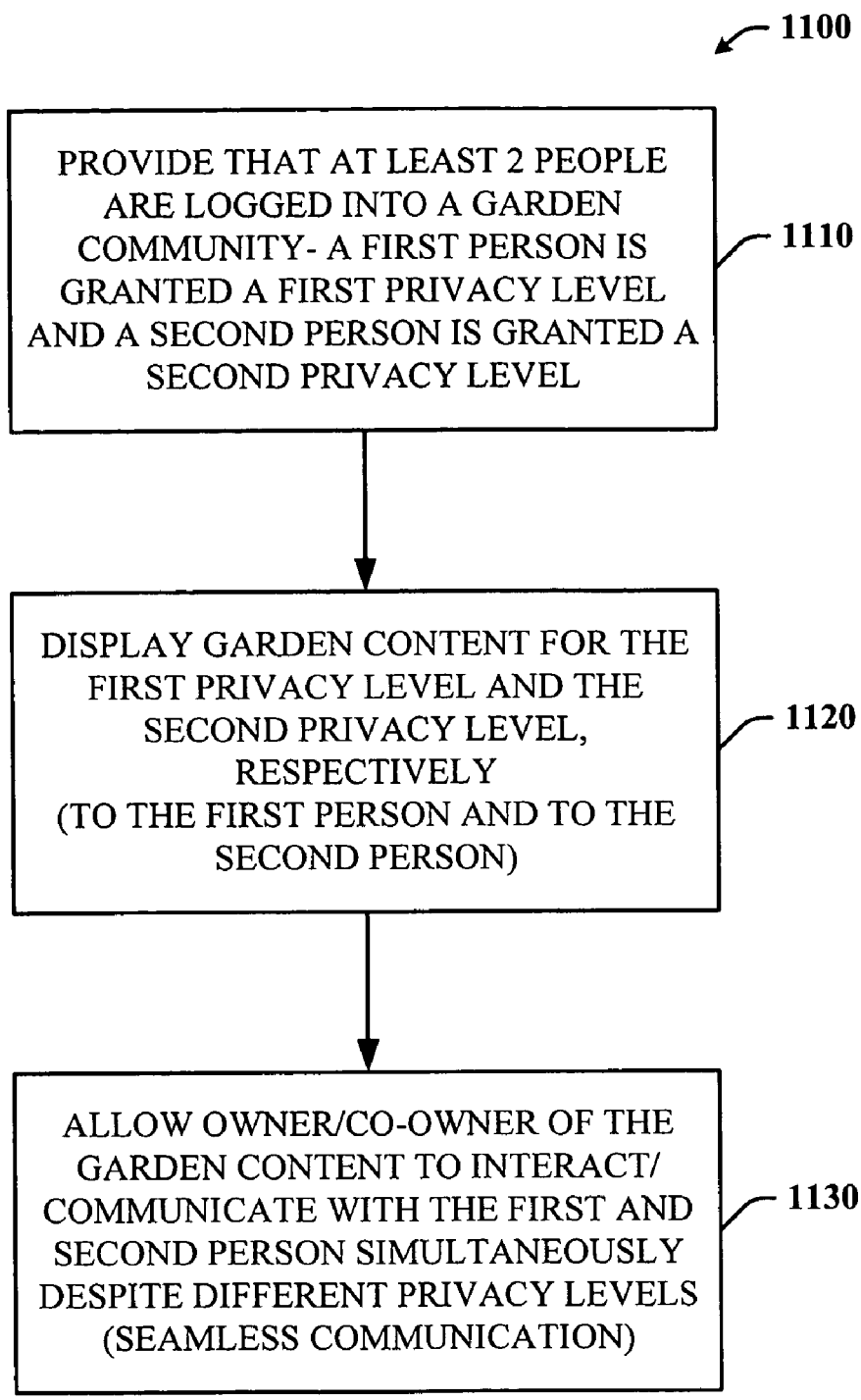
FIG. 11 is a flow chart illustrating an exemplary methodology that facilitates interaction between a person and a user's garden in accordance with an aspect of the subject invention.

Moving on to FIG. 11, there is a flow diagram of an exemplary method 1100 that facilitates interaction between a person and a user's garden in accordance with an aspect of the subject invention. The method 1100 involves providing that at least two people are logged into a garden-based community at 1110. In particular, at least a first person is assigned a first privacy level and at least a second person is assigned a second privacy level—which is different from the first privacy level. For example, given privacy levels 0-2, where 0 is the least private (e.g., public) and 2 is the most private for this particular user, the first privacy level can be "0" and the second privacy level can be "2". At 1120, the garden content for the first and second privacy levels can be displayed to the first and second persons, respectively.

Following, the user (owner or co-owner of garden content) can interact or otherwise communicate with the first and second persons at the same time at the two different privacy levels (at 1130). It should be appreciated that communication between the user and either person can begin at any time such as via IM (instant messaging), email, chat program, and/or blogging; however, access to the user's gardens can be granted after the appropriate privacy level of each person has been established. In practice, for instance, imagine that John and Jane are friends of Tim and desire access to Tim's gardens. Tim has given John access to his public garden and Jane access to his privacy level 1 garden. The three can "talk" to each other online at any time, however, John and Jane's privacy levels should be identified before permitting them access to their respective gardens to view the content or post messages, comments, etc. in their respective gardens.

Figure 12:
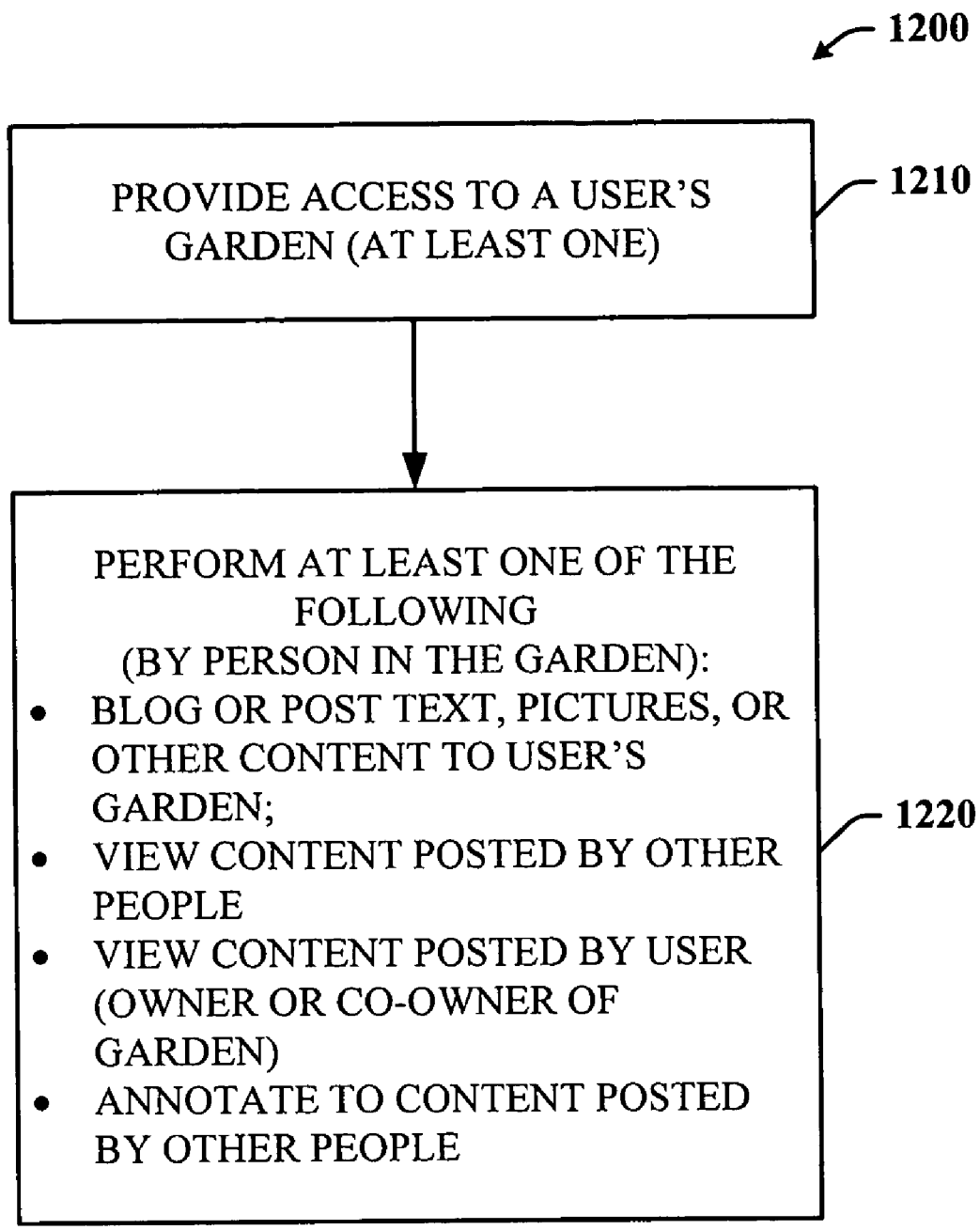
FIG. 12 is a flow chart illustrating an exemplary methodology that facilitates a person's interaction with a user's garden in accordance with an aspect of the subject invention.

Referring now to FIG. 12, there is a flow chart illustrating an exemplary method 1200 that facilitates a person's interaction with a user's garden in accordance with an aspect of the subject invention. The method 1200 begins with providing a person with access to a user's garden at 1210. At 1220, the person can perform at least one of the following with respect to this garden: blog or post text, pictures, or other content to the user's garden; view content posted by other people; view content posted by the user; and/or annotate to content previously posted by other people or by the person. In addition, the user can make some content available for passive viewing from outside of the garden context in a controlled manner such as through syndicated feeds (e.g., RSS), for example. Gardens can be owned by more than one user; thus, they can be controlled by multiple users.

Figure 13:
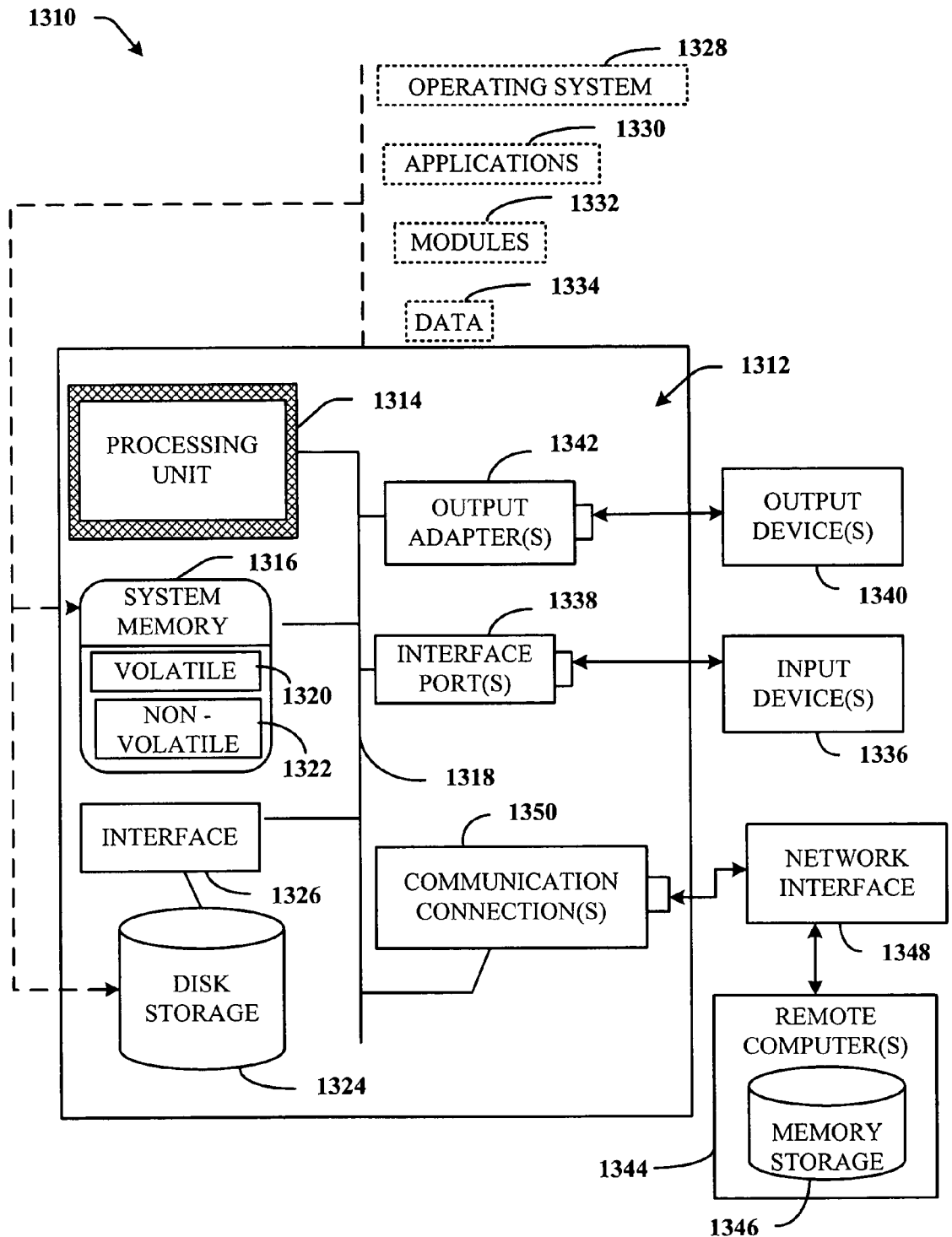
FIG. 13 illustrates an exemplary environment for implementing various aspects of the invention.

In order to provide additional context for various aspects of the subject invention, FIG. 13 and the following discussion are intended to provide a brief, general description of a suitable operating environment 1310 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus (DRDRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A controlled communication system comprising one or more computer-readable device to store:
    a content organization component to upload a user's content to make it available to a person via an online community;
    a privacy assignment component to assign one or more content privacy levels to the user's uploaded content;
    a data analysis component to assign examine the person's access input to determine a person privacy level to the person to establish a level of access the person has with respect to the user's uploaded content;
    a context control component to regulate a transmission of an unaltered communication pertaining to the user's uploaded content, the communication regulated based on an autonomous comparison of the content privacy level assigned to the user's uploaded content to the person privacy level;
    an analysis component for recognizing the communication as being related to a restricted portion of the user's uploaded content based on a comparison between one or more words of the communication and one or more keywords associated with the restricted portion of the user's uploaded content; and
    an artificial intelligence (AI) module to alter the person privacy level to enable the person to remotely access the restricted portion of the user's uploaded content.

2. The system of claim 1, wherein the person is restricted from accessing the restricted portion of the user's uploaded content until the AI module alters the person privacy level.

3. The system of claim 1, wherein the access input comprises the person's login data.

4. The system of claim 1, wherein the user's uploaded content is organized into one or more groups consisting of a distinct group or an overlapping group.

5. The system of claim 4, wherein each of the one or more groups of the user's uploaded content is assigned a group content privacy level.

6. The system of claim 1, wherein the privacy assignment component assigns the one or more content privacy levels to the user's uploaded content in response to the user manually dictating the one or more content privacy levels to the privacy assignment component.

7. The system of claim 1, further comprising a multi-context communication component to facilitate user communication with other people logged into an online community at a plurality of person privacy levels at the same time and that mitigates the user from explicitly switching between different privacy contexts.

8. The system of claim 1, wherein the AI module raises the person privacy level to give the person full access to the user's uploaded content.

9. The system of claim 1, wherein the AI module outputs a recommendation to the user to alter the person privacy level.

10. The system of claim 1, wherein the user's uploaded content is organized in at least one of the following manners: hierarchal, non-overlapping, non-hierarchal, partially overlapping, or completely overlapping.

11. A computer-implemented method that facilitates controlled communication in a plurality of privacy contexts comprising:
    uploading a user's content to a social online community, a first portion of the user's content having a first privacy level and a second portion of the user's content having a second privacy level;
    sorting the user's content in accordance with the first privacy level and the second privacy level;
    launching, via a context control component, a first privacy context communication stream between the user and a first person regarding the user's content, the first privacy context communication stream restricted to the first portion of the user's content;
    launching, via the context control component, a second privacy context communication stream among the user, the first person, and a second person regarding the user's content, the second privacy context communication stream unrestricted with respect to the user's content, the first privacy context communication stream occurring substantially simultaneously with the second privacy context communication stream.

12. The computer-implemented method of claim 11, further comprising altering the first person's access to the second privacy context communication stream by assigning the second privacy context communication stream to a lower communication privacy level during a transmission of the second privacy context communication stream.

13. The computer-implemented method of claim 11, further comprising determining a first person privacy context from a login data.

14. The computer-implemented method of claim 11, further comprising organizing the second privacy context communication stream into one or more groups.

15. The computer-implemented method of claim 14, further comprising assigning each group a group privacy context.

16. The computer-implemented method of claim 11, further comprising automatically assigning the first person a person's privacy context based on at least one of user actions and user communications.

17. The computer-implemented method of claim 11, further comprising:
- presenting the first privacy context communication stream to the user including a visual representation of the presentation of the first privacy context communication stream indicating that the first privacy context communication stream is associated with the first portion of the user's content; and
- presenting the second privacy context communication stream to the user including a visual representation of the presentation of the second privacy context communication stream indicating that the second privacy context communication stream is associated with both the first portion of the user's content and the second portion of the user's content.

18. A controlled communication system comprising:
- a processor; and
- a memory into which a plurality of computer-executable instructions are loaded, the plurality of instructions performing a method comprising:
- examining an access input provided by a person;
- assigning a communication privacy level to a social network-based communication stream owned by at least one user;
- determine a privacy context of the social network-based communication stream the privacy context pertaining to an amount of access that the person has to the social network-based communication stream based on the at least one person's access input; and
- altering the communication privacy level of the social network-based communication stream during a transmission of the communication to give the person unrestricted access to the social network- based communication stream.

19. The system of claim 18, further comprising:
- monitoring at least one of user actions and user communications with the person; and automatically determining the privacy context based on at least one of the user actions and the user communications.

* * * * *